United States Patent
Mueller et al.

(10) Patent No.: US 6,191,562 B1
(45) Date of Patent: Feb. 20, 2001

(54) CIRCUIT CONFIGURATION FOR DEGRADATION OF THE STORED MAGNETIC ENERGY OF A FIELD WINDING OF A GENERATOR

(75) Inventors: Wolfgang Mueller, Stuttgart; Oliver Luz, Lichtenwald; Richard Schoettle, Oelbronn; David Frey, Hoenheim, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/368,845

(22) Filed: Aug. 5, 1999

(30) Foreign Application Priority Data

Aug. 5, 1998 (DE) .................................................. 19835317

(51) Int. Cl.⁷ ...................................................... H02P 9/10
(52) U.S. Cl. .............................. 322/59; 322/68; 322/69; 323/282
(58) Field of Search ................................ 322/59, 68, 69, 322/75; 323/282, 283

(56) References Cited

U.S. PATENT DOCUMENTS

| | | | | |
|---|---|---|---|---|
| 4,200,832 | * | 4/1980 | Johansson et al. ................ | 322/59 |
| 4,354,182 | * | 10/1982 | Frey ..................................... | 340/650 |
| 4,388,586 | * | 6/1983 | Lamoth ............................... | 323/283 |
| 4,733,159 | * | 3/1988 | Edwards et al. .................... | 323/282 |
| 4,789,817 | * | 12/1988 | Asakura et al. .................... | 322/28 |
| 5,296,798 | * | 3/1994 | Pierret et al. ...................... | 322/28 |
| 5,550,456 | * | 8/1996 | Shekhwat et al. .................. | 322/25 |
| 5,583,420 | * | 12/1996 | Rice et al. ......................... | 322/25 |
| 5,617,011 | * | 4/1997 | Hammer et al. .................... | 322/28 |
| 5,801,516 | * | 9/1998 | Rice et al. ......................... | 322/37 |
| 5,850,138 | * | 12/1998 | Adams et al. ..................... | 322/68 |
| 5,903,130 | * | 5/1999 | Rice et al. ......................... | 318/811 |

* cited by examiner

*Primary Examiner*—Nicholas Ponomarenko
(74) *Attorney, Agent, or Firm*—Kenyon &Kenyon

(57) ABSTRACT

Circuit configuration for degradation of the stored magnetic energy of a field winding of a generator, where a battery voltage is applied to the field winding, having a power switch that is in operative connection with the field winding and is controllable by timed pulses from a clock control and which controls the storage and degradation of energy of the field winding. A zener diode is arranged between the field winding and a control input of a power switch for control of the energy degradation of the field winding, in particular of the power switch.

9 Claims, 3 Drawing Sheets

CIRCUIT CONFIGURATION FOR DEGRADATION OF THE STORED MAGNETIC ENERGY OF A FIELD WINDING OF A GENERATOR

BACKGROUND INFORMATION

During the operation of motor vehicle generators, for instance claw pole generators, sudden surge voltages occur in response to a load dump because the magnetomotive force or the stored magnetic energy of the field winding of the generator can only be degraded at a finite rate. Traditionally, the resultant voltage increase in the vehicle electrical system can only be prevented by using additional, expensive components, such as power zener diodes.

Various circuits for quenching or degrading the stored magnetic energy of a field winding are known from the related art.

We will first describe one known quenching circuit with reference to FIG. 3. A generator G is furnished with a field winding 10 that is characterized by its inductor L and its ohmic resistor R. The storage or quenching of energy of field winding 10 is controlled by a power transistor T, which in normal operation is operated by timed pulses from a clock control 20. Field coil 10 and power transistor T are connected in series to a battery voltage Ubatt.

As mentioned above, in normal operation, power transistor T is operated by timed pulses, for instance by the process of pulse width modulation. During the conductive state of power transistor T, energy is stored in field coil 10. A diode D makes a free-running circuit of field coil 10. During the non-conducting state of power transistor T, i.e. the free-running phase of field coil 10, the magnetic energy stored in the field coil is degraded via the free-running circuit. The counter-voltage required for the energy degradation corresponds to the conducting-state voltage of diode D of the free-running circuit, which is typically about 0.7 V. The degradation of energy proceeds relatively slowly, corresponding to this low counter-voltage. While this behavior is desirable in normal operation, in the event of a load dump, the energy degradation in the field coil proceeds too slowly, despite immediate intervention by the regulator, because the low counter-voltage does not permit rapid degradation of energy. This leads to surge voltages in the vehicle electrical system which must be suppressed, as for example by the use of expensive power zener diodes.

FIG. 4 shows a so-called H-bridge circuit for degradation of the energy of a field coil, which is known from the related art. The components illustrated here have the same reference numbers as those in FIG. 3. The circuit has two power switches $S_1$, $S_2$ that can take the form, for example, of transistors. In normal operation, both power switches $S_1$, $S_2$ are closed for storage of energy in field winding 10. In this case, current flows via power switch $S_1$, inductor L, resistor R and power switch $S_2$. During the free-running, one of the power switches is closed, which facilitates a degradation of the magnetic energy of field winding 10 according to the design approach described above with reference to FIG. 3.

For rapid degradation or quenching of the magnetic energy of field winding 10, both power switches $S_1$, $S_2$ are opened simultaneously. The current now flows via diode $D_2$, inductor L, resistor R and diode $D_1$. In this case, diodes $D_1$, $D_2$ are traversed by the flow in the direction of conductance. Hence the current flows against the battery voltage (for example, 14 V) and the conducting-state voltages of the two diodes $D_1$, $D_2$. The counter-voltage required for this is built up by the self-inductance of field coil 10.

SUMMARY OF THE INVENTION

An object of the present invention is to create an inexpensive circuit configuration to ensure a rapid and reliable degradation of the stored magnetic energy in a field coil of a generator, especially for compensation of a sudden load dump.

With the present invention, it becomes possible to degrade the stored energy or the inductance of a field winding of a generator much more quickly than is possible with the related art. This is particularly important in the event of a load dump, that is, the disconnection or sudden outage of a load. The duration of the surge voltage at the output side of a generator is substantially reduced by the present invention. The amount of quenching energy to be absorbed by protective elements, for instance power zener diodes, at the output side of the generator is likewise substantially smaller. This leads to cost savings, since it becomes possible to use protective elements of lesser capacity. Further benefits result from a smaller requisite installation space and less thermal energy to dissipate. It should be noted that the power switch for the timed control of the field winding is not necessarily the same power switch whose control input can be triggered via the zener diode. However, it is preferable to furnish just one power switch to carry out the aforementioned functions.

It is efficacious to furnish the circuit configuration of the present invention with a free-running circuit that is in operative connection with the field winding and which includes at least one diode and at least one power switch. This arrangement provides for traditional diode quenching, as for example was explained above with reference to FIG. 3, when the circuit configuration is operating normally. The normal operation of the exciting current regulator of the generator, especially a motor vehicle generator, is not affected by the inventive quenching of the energy of the field winding by a zener diode. In addition, the inventive principle of quenching via a zener diode can also be utilized during normal operation as an expanded corrective intervention for generator regulation. This permits an increase in the control dynamic response, since the corrective intervention on the excitation side is improved. In a preferred embodiment of the circuit configuration according to the present invention, a diode is situated between the field coil and the zener diode.

In a preferred form of the circuit configuration of the present invention, the power switch for control of the storage and degradation of energy of the field winding and/or the power switch of the free-running circuit are MOS field effect transistors. These transistors are reliably and inexpensively available. However, other controllable switches may also be used, for instance a bipolar transistor or an IGBT. This power switch can be triggered by way of the known high-side drives; however, use of a smart-power MOS field effect transistor in which the high-side drive is integrated is also conceivable, among other possibilities.

The generator can be a synchronous generator, for example a claw pole generator. A generator such as this is relatively light and is inexpensive to manufacture. In combination with the circuit configuration of the present invention which, as mentioned above, requires little installation space, one can obtain very compact generator units.

One distinguishing feature of the process of the present invention is that, in case of an event such as a sudden load dump, a change-over takes place from a first mode of operation, in which the power switch that controls the field winding of the generator is operated with timed pulses, to a second operating state in which the discharging current of the field winding, which is induced by the voltage applied to the field winding, at first can flow only via the zener diode (switched in the non-conducting direction relative to this voltage). The voltage applied to the field winding or the voltage that drops off at the zener diode in this mode of operation is essentially the total of the battery voltage and the voltage caused by self-induction of the field winding. The control input of the power switch or transistor is triggered only when the breakdown (avalanche) voltage of the zener diode is exceeded such that the power switch or transistor is at least partially force-tripped and can dissipate a discharging current from the field winding.

In the second operating state, it is efficacious to have the power switch of the free-running circuit open. This provides a simple manner for decoupling the free-running circuit from the currents or voltages that arise during the second operating state.

In another preferred embodiment of the process of the present invention, the voltage applied to the field winding is sent via the zener diode and another diode to the control input of the power switch.

DETAILED DESCRIPTION

Figure 1:
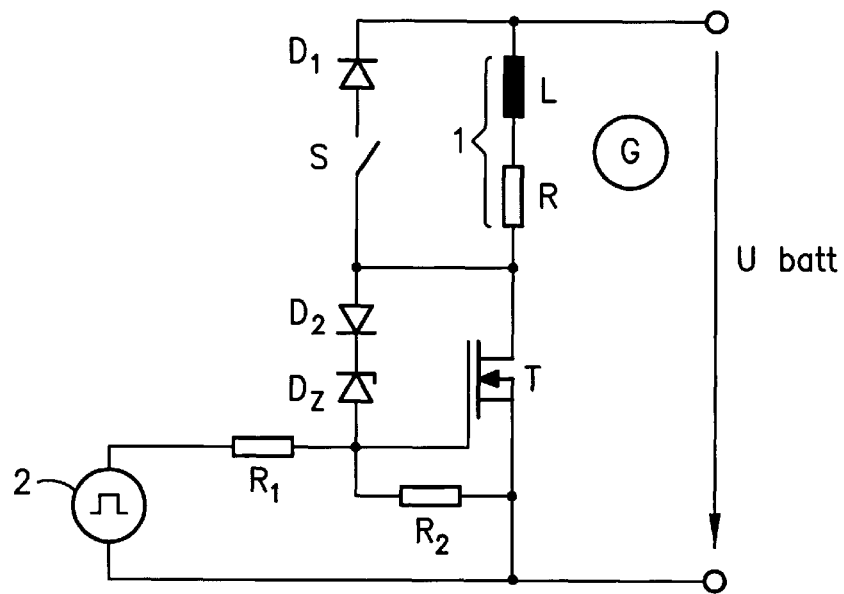
FIG. 1 is a block diagram of a preferred embodiment of the circuit configuration for degradation of the stored magnetic energy of a field coil of a generator, according to the present invention.

The circuit configuration shown in FIG. 1 has a generator G with a field winding 1 that is characterized by its inductor L and its ohmic resistor R. The storage or quenching of energy of field winding 1 is controlled by a power transistor T which, in normal operation, is operated with timed pulses from a clock control 2. Resistors $R_1$ and $R_2$ are provided between clock control 2 and the gate and source connections, respectively, of transistor T. Field coil 1 and power transistor T are connected in series to battery voltage Ubatt. A power switch S and a diode $D_1$ form a free-running circuit of field coil 1.

The circuit configuration also has a diode $D_2$ and a zener diode $D_Z$ that are arranged between field winding 1 and power transistor T in such a way that, in the event of an opening of power switch S, current can flow from field winding 1 via diode $D_2$ and zener diode $D_Z$ to the control connection of power transistor T.

As one finds in the related art, power transistor T is operated with timed pulses, for example by the process of pulse width modulation, in normal operation or a first mode of operation. During the conducting state of power transistor T, energy is stored in field coil 1. Power switch S is closed in this operating state.

During the non-conducting state of power transistor T, i.e. the free-running phase of field coil 1, the energy stored therein is degraded via the free-running circuit. The counter-voltage required for energy degradation is equivalent to the total of the conducting-state voltages of diode $D_1$ and of power switch S, typically about 1.5 V. In line with this relatively low counter-voltage, the degradation of energy proceeds slowly. This behavior is desirable in normal operation to guarantee exciting current with little ripple.

In the event of a load dump in the vehicle electrical system, power switch S is opened and power transistor T is blocked by immediate regulator intervention with the assistance of a regulator (not shown). Based on self-induction, a voltage Ui that has the same direction as the battery voltage Ubatt builds up in field coil 1. Since power transistor T is blocked, the discharging current of field coil 1 can at first flow only via diode $D_2$ and zener diode $D_Z$ (in the non-conducting direction). The breakdown or zener voltage Uz drops off at the zener diode in the non-conducting direction. It is only when the total of the voltages Ubatt and Ui exceeds the zener voltage that a control voltage is generated at the gate or control connection of the power transistor, by which the power transistor is biased into conduction, such that a discharging current can flow directly from field coil 1 via power transistor T.

When a discharging current flows through power transistor T, the voltage applied to zener diode $D_Z$ drops, so that the control voltage at the gate connection of the power transistor also decreases. Since the discharging current through power transistor T again decreases as a result, and consequently the voltage applied to the zener diode $D_Z$ again increases, a control circuit for degradation of the energy in field coil 1 is created, in which a controlled voltage drops off via power transistor T.

The counter-voltage required for the discharge is equivalent to the total of the zener voltage of zener diode $D_Z$, typically 70 V, and, in the event an MOS field effect transistor is used as power transistor T, the threshold voltage of power transistor T. Through appropriate selection of the zener voltage of zener diode $D_Z$, the magnitude of the counter-voltage can be varied and thus the duration of the discharging process can be influenced.

Figure 4:
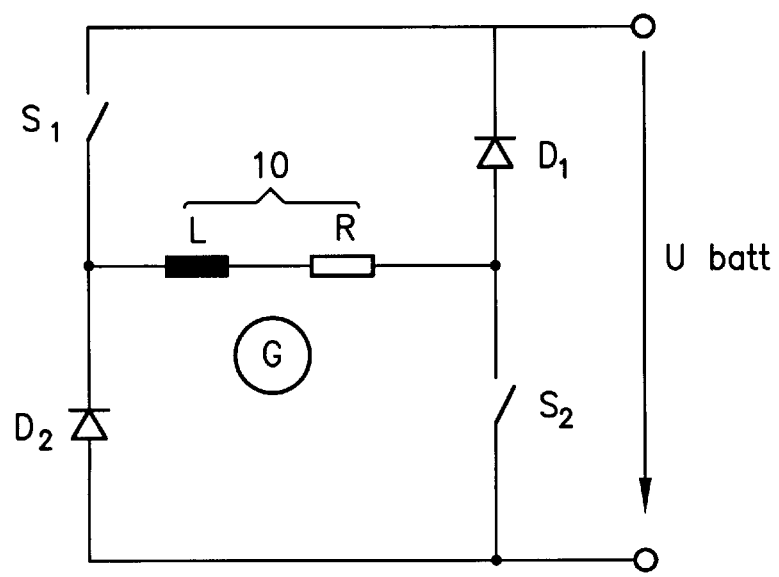
FIG. 4 is a block diagram of another state-of-the-art circuit configuration for degradation of magnetic energy.

FIG. 4 shows an exemplary comparison of the degradation or quenching of energy using the circuit configuration of the present invention (zener quenching), and the degradation of energy that takes place by traditional diode quenching. In each case, the field coil current is plotted against time. It can be seen that degradation of the energy stored in the field winding takes place much more quickly with use of the circuit configuration of the present invention. The following circuit parameters were chosen for the exemplary comparison in FIG. 4:

L=220 mH
R=2 Ω
Uz=70 V
Ubatt=14 V.

Figure 5:
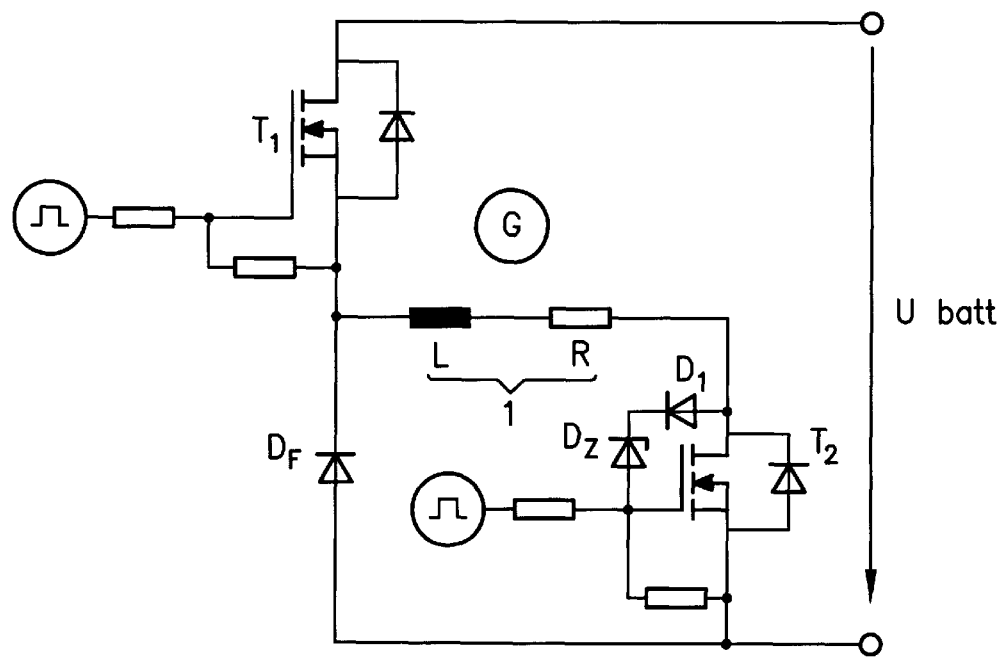
FIG. 5 is a block diagram of a further embodiment of the circuit configuration according to the present invention for degradation of the stored magnetic energy of a field coil of a generator.
Figure 2:
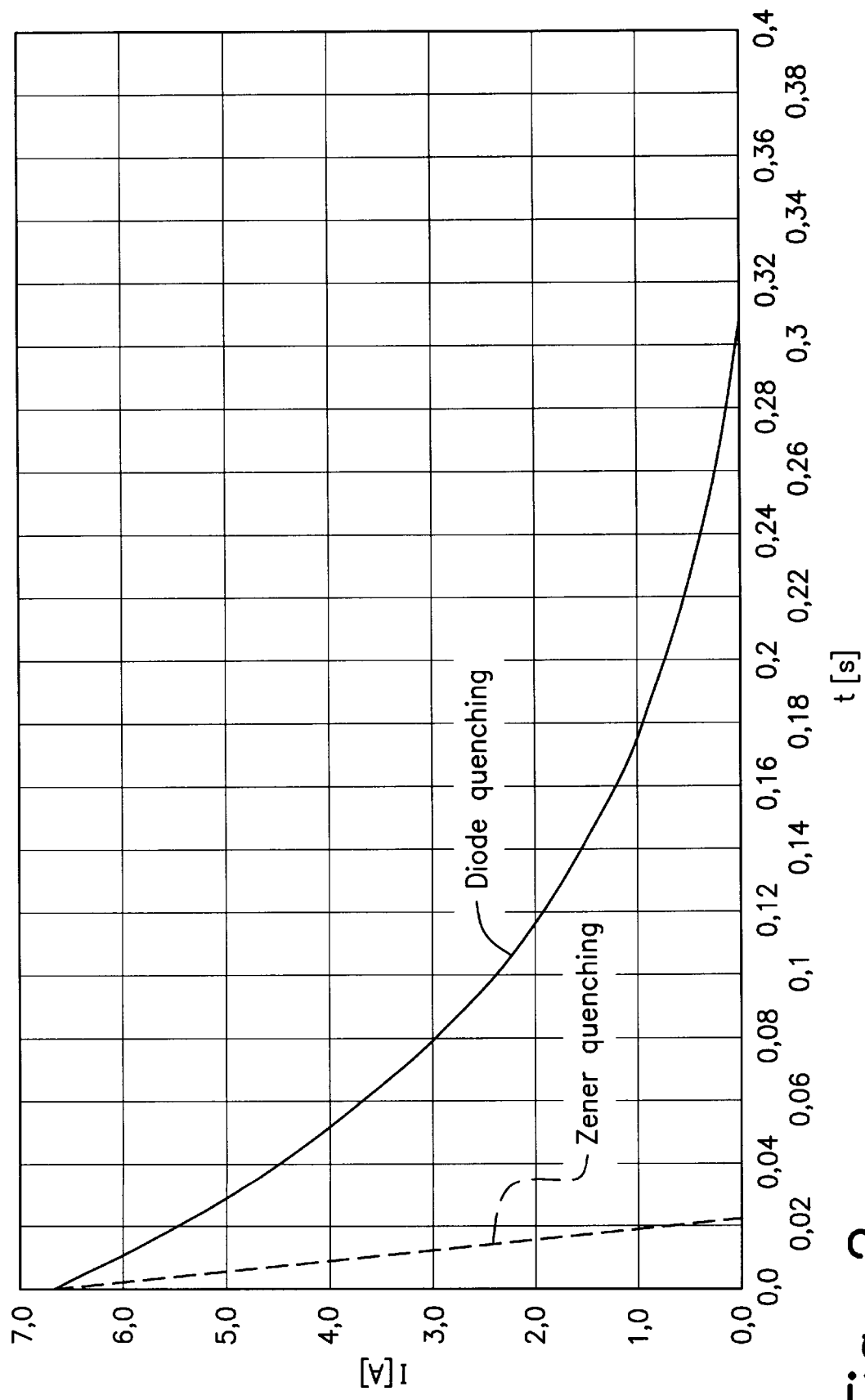
FIG. 2 is a diagram in which the field coil current is shown to illustrate the rate of energy degradation of the circuit configuration of the present invention in comparison to that of a circuit configuration according to the related art.
Figure 3:
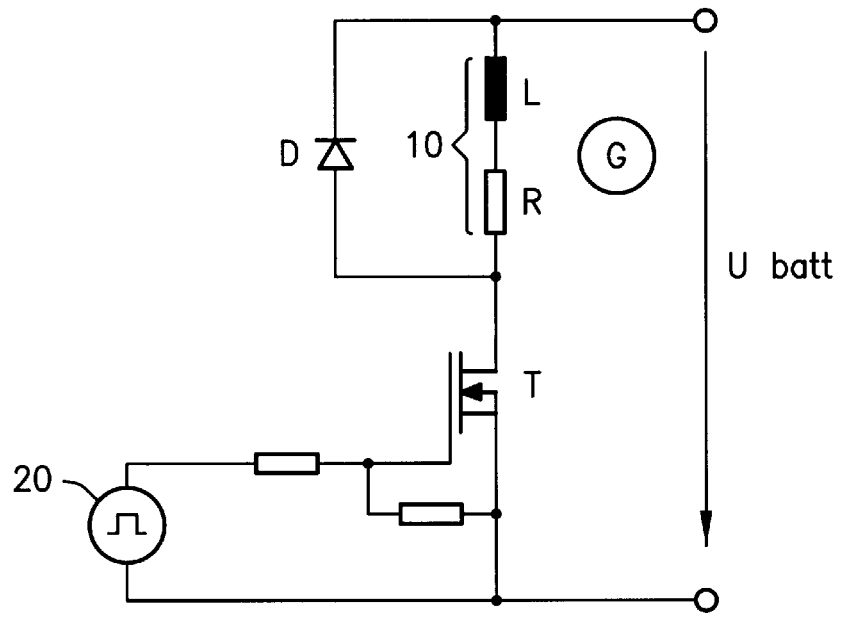
FIG. 3 is a block diagram of a state-of-the-art circuit configuration for degradation of magnetic energy.

The circuit shown in FIG. 5 represents a variant of the circuit presented in FIG. 1 for degradation of the stored magnetic energy of a field winding of a generator with the aid of rapid zener quenching.

In normal operation, when the exciting current is controlled at a constant value, transistor $T_2$, preferably a MOSFET, is permanently conductive. Transistor $T_1$ is driven by timed pulses with the aid of known processes such as PWM (pulse width modulation) or two-level control. When transistor $T_1$ conducts, energy from the source Ubatt is stored in the exciting circuit, the exciting current flows via transistor $T_1$, field winding 1 (L, R) and transistor $T_2$. If transistor $T_1$ is blocked, the energy stored in the exciting circuit can degrade in free-running circuit L, R, $T_2$ and $D_F$. The low counter-voltage of approximately 1.5 V (conducting-state voltage of $D_F$ and of conducting transistor $T_2$) permits only a slow degradation of energy, which is desired in this operating state.

In the event of a load dump, both transistors $T_1$ and $T_2$ are blocked by the drive. In the first moment, the energy stored in the exciting circuit can only degrade via diodes $D_1$ and $D_Z$, with the result that the gate of transistor $T_2$ charges and transistor $T_2$ is operated in its active range. This causes an increase in the counter-voltage required for rapid degradation of energy (rapid zener quenching) to the level of the breakdown voltage, e.g. 70 V, of diode $D_Z$, which is preferably a zener diode. The energy stored in the exciting circuit likewise degrades as with normal operation in the free-running circuit via field winding 1 (L, R), diode $D_F$ and transistor $T_2$, yet transistor $T_2$ is operated in its active range as already described. In this manner, the degradation of energy proceeds in a relatively short period of time, as described in connection with FIG. 1, so that the effects of surge voltages on the vehicle electrical system can be reduced in the event of a load dump, thus of a rapid load reduction.

What is claimed is:

1. A circuit configuration for a degradation of a stored magnetic energy of a field winding of a generator, a battery voltage being applied to the field winding, the circuit configuration comprising:

a power switch operatively connected to the field winding, the power switch having a control input;

a clock control for providing timed pulses to the control input of the power switch to control the power switch and to control a storage and a degradation of energy of the field winding; and a zener diode coupled between the field winding and the control input of the power switch for providing a control of an energy degradation of the field winding and of the power switch.

2. The circuit configuration according to claim 1, further comprising a free-running circuit operatively connected to the field winding, the free-running circuit including at least one further diode and at least one further power switch.

3. The circuit configuration according to claim 1, further comprising an additional diode coupled between the field winding and the zener diode.

4. The circuit configuration according to claim 1, wherein the power switch includes a MOS field effect transistor.

5. The circuit configuration according to claim 1, wherein the generator is a synchronous generator.

6. The circuit configuration according to claim 1, wherein the generator is a claw pole generator.

7. A process for controlling a circuit configuration, comprising the steps of:

in a first mode of operation, operating a power switch by timed pulses from a clock control; and in a second mode of operation, interrupting a clock-pulse operation of the power switch, and sending a voltage applied to a field winding, via a zener diode which is switched in a non-conductive direction relative to the voltage, to a control input of the power switch to control a degradation of a stored energy of the field winding and of the power switch.

8. The process according to claim 7, wherein the power switch of a free-running circuit is open in a second operating state.

9. The process according to claim 7, wherein the voltage is sent to the control input of the power switch via the zener diode and an additional diode.

* * * * *